(12) United States Patent
Lunteren

(10) Patent No.: US 6,381,668 B1
(45) Date of Patent: Apr. 30, 2002

(54) ADDRESS MAPPING FOR SYSTEM MEMORY

(75) Inventor: Jan Van Lunteren, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/194,275

(22) PCT Filed: Mar. 21, 1997

(86) PCT No.: PCT/IB97/00276

§ 371 Date: Nov. 20, 1998

§ 102(e) Date: Nov. 20, 1998

(87) PCT Pub. No.: WO98/43168

PCT Pub. Date: Oct. 1, 1998

(51) Int. Cl.$^7$ .............................................. G06F 12/00
(52) U.S. Cl. ........................ 711/5; 711/202; 711/206; 711/157
(58) Field of Search ............................ 711/157, 5, 202, 711/206, 203, 117; 714/8

(56) References Cited

U.S. PATENT DOCUMENTS

| | | | | | |
|---|---|---|---|---|---|
| 5,111,389 | A | * | 5/1992 | McAuliffe et al. | 711/203 |
| 5,396,619 | A | * | 3/1995 | Walton | 714/8 |
| 5,412,788 | A | * | 5/1995 | Collins et al. | 711/157 |
| 5,848,258 | A | * | 12/1998 | Fenwick et al. | 711/5 |
| 5,924,111 | A | * | 7/1999 | Huang et al. | 711/5 |
| 6,070,227 | A | * | 5/2000 | Rokicki | 711/117 |
| 6,108,745 | A | * | 8/2000 | Gupta et al. | 711/3 |

* cited by examiner

Primary Examiner—Matthew Kim
Assistant Examiner—Fred F. Tzeng
(74) Attorney, Agent, or Firm—Scully, Scott, Murphy & Presser; Casey P. August

(57) ABSTRACT

For optimizing access to system memory having a plurality of memory banks, interleaving can be used when storing data so that data sequences are distributed over memory banks. The invention introduces an address-mapping method applying a table lookup procedure so that arbitrary, non-power-of-two interleave factors and numbers of memory banks are possible for various strides.

23 Claims, 11 Drawing Sheets

FIG. 3A
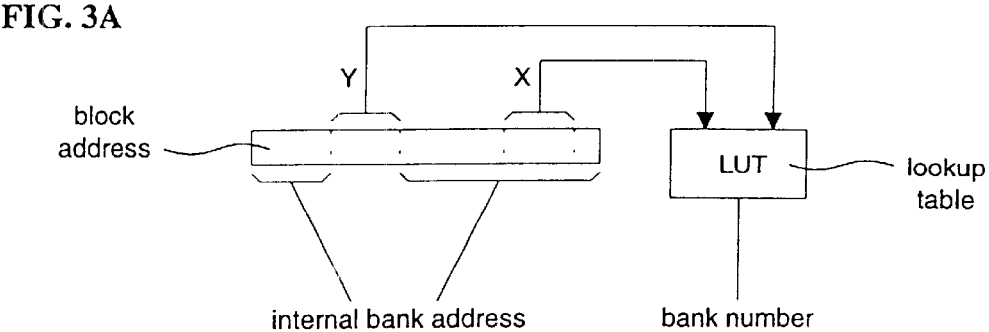
FIG. 3B
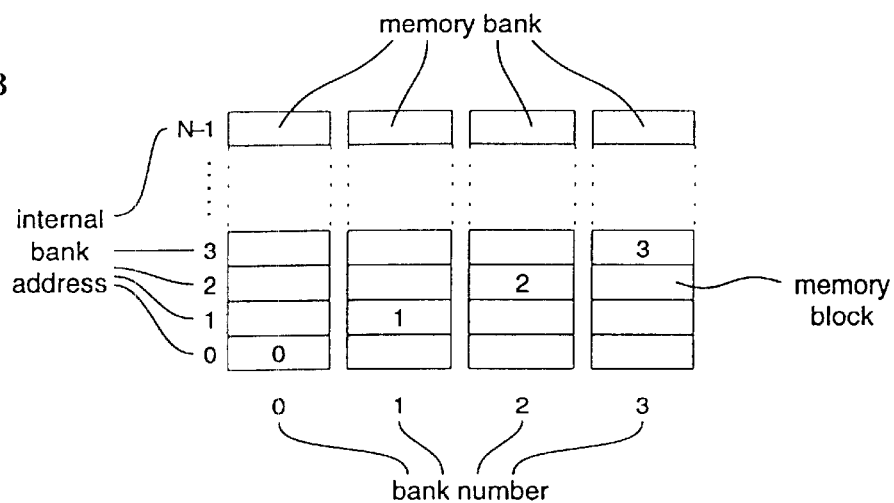
FIG. 3C

IF = 4
ST = $2^{13}$ = 20000 (hex)
M = 4

IF = 2 2/3
ST = $2^0$ = 1
M = 4

|   | Y |   |   |   |
|---|---|---|---|---|
|   | 0 | 1 | 2 | 3 |
| 0 | 0 | 1 | 2 | 3 |
| 1 | 1 | 2 | 3 | 0 |
| 2 | 2 | 3 | 0 | 1 |
| X 3 | 3 | 0 | 1 | 2 |
| 4 | 0 | 1 | 2 | - |
| 5 | 1 | 2 | 0 | - |
| 6 | 0 | 1 | 2 | - |
| 7 | 1 | 2 | 0 | - |

| FFFFF | 2FFFFF | 0FFFFF | 1FFFFF |        |
|-------|--------|--------|--------|--------|
| 80003 | 280003 | 80003  | 180003 |        |
| 80002 | 80002  | 180002 | 280002 |        |
| 80001 | 280001 | 80001  | 180001 |        |
| 80000 | 80000  | 180000 | 280000 |        |
| 7FFFF | 17FFFF | 27FFFF | 37FFFF | 7FFFF  |
| 4     | 4      | 100004 | 200004 | 300004 |
| 3     | 100003 | 200003 | 300003 | 3      |
| 2     | 200002 | 300002 | 2      | 100002 |
| 1     | 300001 | 1      | 100001 | 200001 |
| 0     | 0      | 100000 | 200000 | 300000 |
|       | 0      | 1      | 2      | 3      |

IF (1)  = 4 (LOWER)
IF (2)  = 2 (UPPER)

ST (1, 2) = $2^0$ = 1
M        = 4

ADDRESS MAPPING FOR SYSTEM MEMORY

FIELD OF INVENTION

Present invention relates generally to address mapping for accessing system memory, and more particularly to address mapping for memories consisting of a plurality of memory banks in which interleaving of stored information is effected.

Meaning of Terms

As some technical terms are not used uniformly in this field, a few definitions are given in the following to clarify the meaning of terms as they are used in this patent application.

- Virtual address=an address as used in programs (normal meaning)
- Physical address an address uniquely identifying the position in memory (as obtained from a virtual address e.g. by a table lookaside operation)
- Memory bank=a piece of memory that can be separately accessed (also called memory module; it may be a memory chip)
- Location=a storage place which can be separately addressed, can store usually one byte or word
- Line=a portion of a memory bank handled as a whole and addressed as a whole, often consists of a power of 2 number of locations (1, 2, 4, etc.)
- Block=a portion of memory handled as a whole (in a given context) and addressed as a whole, here it will consist of one line (lookup table (LUT) with bank numbers) or multiple lines (LUT with masks/bit vectors)
- Stride=an address sequence $a_0, a_1, a_2, a_3, \ldots$ has a stride S when for each two succeeding addresses holds: $a_{i+1}=a_i+S$ (i.e., the address sequence is $a_0, a_0+S, a_0+2S, a_0+3S, \ldots$) In the drawings, abbreviation ST is used for a stride.
- Interleave factor=The interleave factor for an address sequence $a_0, a_1, a_2, a_3, \ldots$ is the average number of memory banks that can be accessed in parallel when accessing the addresses of the address sequence in the given order.

Background

In data processing systems, addresses as used in programs are usually virtual addresses which do not reflect where in systems memory the respective information is actually stored. Because of limited storage capacity, only those data or programs are loaded which are actually used, and this may be anywhere in memory where free space has become or is made available. Thus, by a translation process as shown in FIG. 1A, the virtual address has to be translated into a physical address. The virtual address comprises a page offset and a page number which are translated into a block address and a block offset.

The page offset represents a certain point within a page and the block offset represents a certain point within a block. Usually the least significant part of the page offset is used as block offset and the rest of the page offset is used as the least significant part of the block address. The most significant part of the block address is obtained by translation of the page number via a page table. In systems using as memory one single memory bank, this is already the whole process for addressing a predetermined block i within the memory bank. The page table is updated each time new information is loaded into the memory. The physical address space usually is different from the virtual address space, and the effect of translation is as shown in FIG. 1B.

The physical address space is considered as continous space. Each physical address corresponds to a storage location in one of the memory banks in system memory. A line is a part of a memory bank that consists of a number of storage locations that are addressed as a whole by a line-number or bank-internal address. A block consists of one line or multiple lines. The physical addresses, that are assigned to (mapped on) storage locations contained within one block, are only different from each other in the "x" least significant address bits, called the block offset, where $L=2^x$ equals the number of storage locations in the block. The identical most significant address bits of the physical addresses constitute the block address.

If a block consists of one line and a line consists of one storage location, then the block address equals the physical address.

If blocks of data (or program segments) with consecutive block addresses are mapped on lines within the same memory bank, then a problem occurs if they have to be accessed in the same sequence, because usually, when access has been made to one line, the memory bank needs a short period of time before the next access can be made. Accesses to consecutive block addresses therefore would need more time than is desirable.

One solution to this problem is the interleaving of data (information) in separate memory banks which can be separately accessed. Thus, if storage locations with consecutive block addresses are distributed over separate memory banks, the blocks can be accessed one immediately after the other without any waiting time. The simplest way to do this is to use one portion of the block address as the memory bank number and the rest of the block address as bank-internal address (or line-number), as shown in FIG. 2. As a result, the distribution of consecutive block addresses over the memory is bank-wise which much improves the overall access time in many cases.

However, this known method requires that the number of memory banks is a power of two, and that the interleaving is uniform (sequential) which is not optimal in various applications. In general, it can be said that often, sequential accesses to memory are not randomly distributed but follow a certain pattern depending on the respective application. This is in particular true for scientific applications. Thus, even if information is stored in an interleaved manner in several memory banks, as shown in FIG. 2, sequential accesses for consecutive block addresses may occur to the same memory bank. If possible, memory accesses should be distributed uniformly over all memory banks to achieve best performance.

Some particular interleaving schemes have been developed for scientific applications, such as prime degree interleaving, pseudo-random interleaving and irreducible interleaving. However, with these schemes, address mapping involves complex calculations resulting in larger memory latencies.

Other methods of interleaving which allow some variation have become known and are discussed in the following.

a) U.S. Pat. No. 5,293,607 "Flexible N-way memory interleaving" (Dixon and Asta) discloses a method of memory interleaving where the memory bank number (called "block number" in the text) is determined by an arithmetic combination of selected portions of the given address. This method allows to use an arbitrary number of memory banks, i.e. which need not be a power of two, and it allows the use of different-size memory blocks to some extent. However, the interleaving which can be achieved is not freely selectable because the existing number of memory banks and their size determine the selection of the portions of the given address and thus the resulting bank numbers. Furthermore, if banks of different sizes are used they have to be grouped, and within any group only one predetermined interleave factor is possible. In addition, in this system only power-of-two interleave factors are possible.

b) U.S. Pat. 5,341,486 "Automatically variable memory interleaving system" (Castle) describes an addressing scheme for memory interleaving which allows to use any number of memory banks, and further allows different interleaving factors. However, the memory banks have to be grouped so that each group consists of a number of memory banks which is a power of two, and for each such group only one interleaving factor is possible. Furthermore, the obtained interleaving factors are all powers of two.

c) U.S. Pat. 4,754,394 "Multiprocessing system having dynamically allocated local/global storage and including interleaving transformation circuit for transforming real addresses to corresponding absolute address of the storage" (Brantley et al.) discloses an address mapping method for a multiple-processor system having several separate memory banks (each associated with one processor). In this method, the physical address (called "real address" in the text) can be varied by using certain control variables derived from the original address or the real address, to effect memory access in a portion of each memory bank that is used as local storage (only for the associated processor, no interleaving), and in remaining portions of all memory banks, which portions are used as global storage for all processors. The resulting interleaving factor is dependent on the real address, under control of a value obtained during the virtual-to-real address translation. However, the address transformation disclosed in this patent is only applicable for systems having a power-of-two number of memory banks, and it gives only limited selection possibility for the interleaving scheme similar to those mentioned in connection with FIG. 2. Furthermore, interleaving factors have also to be powers of two.

d) An article "Multi-processing system programmable memory interleave apparatus" by Shippy and Maule, IBM Technical Disclosure Bulletin, November 1992, pp. 400–402 describes a scheme which allows to select the granularity of memory interleave as well as the number of memory banks and the size of each memory bank. Central memory control CMC uses the contents of a storage configuration register for selecting a memory bank, but the the article does not disclose details on the selection, and the system allows only power-of-two numbers of memory banks and power-of-two interleave factors.

All the known methods and systems, though allowing some variation in the interleaving, do not have the possibility to freely select an interleaving scheme that is optimal for various types of applications.

OBJECTS OF THE INVENTION

It is therefore an object of the invention to devise a method of address mapping for system memory that allows a flexible selection of the interleaving scheme for a plurality of memory banks.

It is a further object to devise an address mapping method allowing various interleaving schemes which is applicable in a system memory with any number of memory banks and in which the memory banks can have different sizes.

Another object is to provide mapping means for achieving a flexible selection of the interleaving scheme for a plurality of memory banks and for allowing various interleaving schemes which is applicable in a system memory with any number of memory banks and in which the memory banks can have different sizes.

These objects are achieved by an address mapping method for system memory and by a mapping means as defined in the claims of this patent application.

Following advantages are particulary achieved by the invention:

By selecting the size and location of the two address portions used for accessing the lookup table, and by the contents of that table, it is possible so select a desired mapping scheme from a broad range of different mappings not covered by the interleaving methods known in the prior art.

Selective interleaving schemes are possible for any number of memory banks (even non-power-of-two) and for memory banks of different sizes in the same memory.

Non-integer interleave factors between 1 and the number of memory banks are possible.

Different interleaving schemes can be effected in the same memory.

Selective interleaving for two different power-of-two strides is possible in the same memory (but with limitations for a non-power-of-two number of memory banks).

Due to table-lookup, no complicated arithmetic or other processing operations are required for address mapping.

The mapping scheme can easily be changed by loading another content to the lookup table, or by using several preloaded tables.

If masks are loaded in the lookup table, a plurality of memory banks can be selected simultaneously with a single block address.

In the following, specific embodiments of the invention will be described with reference to the following drawings.

LIST OF DRAWINGS

FIG. 1 (1A and 1B) schematically shows the virtual-to-physical address translation and the relation between virtual and physical address space according to the state of the art.

FIG. 3 (3A, 3B, 3C) shows the principle of the invention, i.e. address mapping using table lookup for determining the memory bank number.

DETAILED DESCRIPTION

Basic Mapping Scheme

Figure 1A:
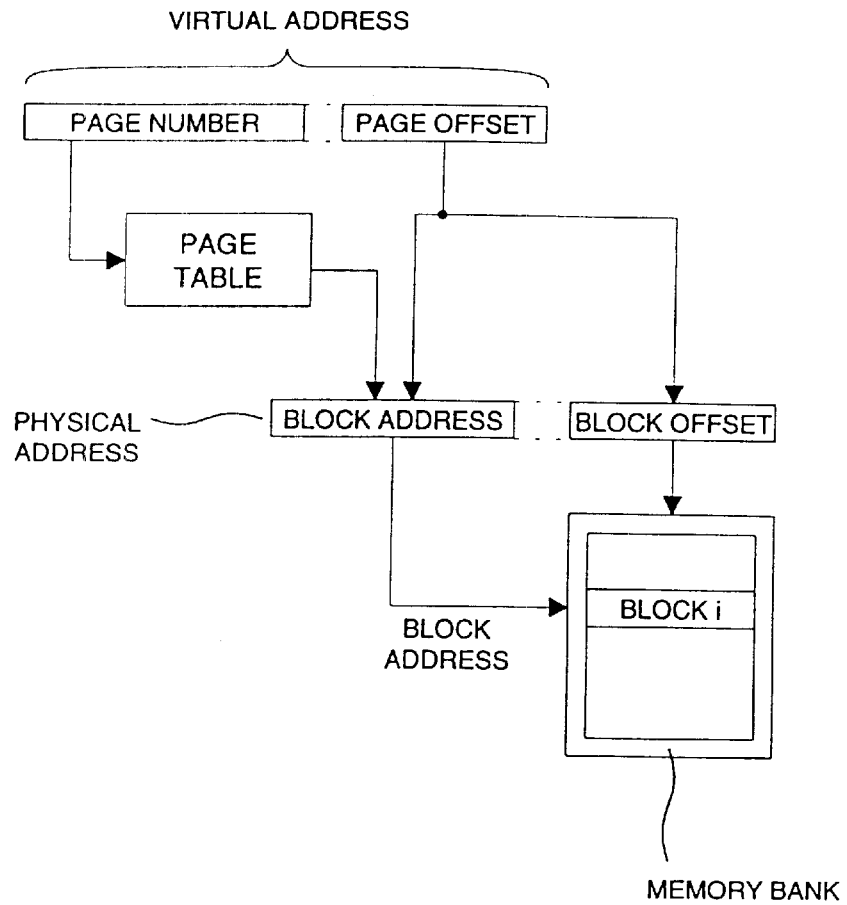
Figure 1B:
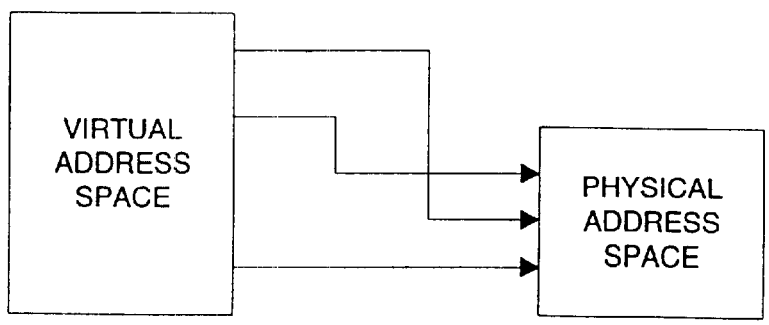
Figure 2:
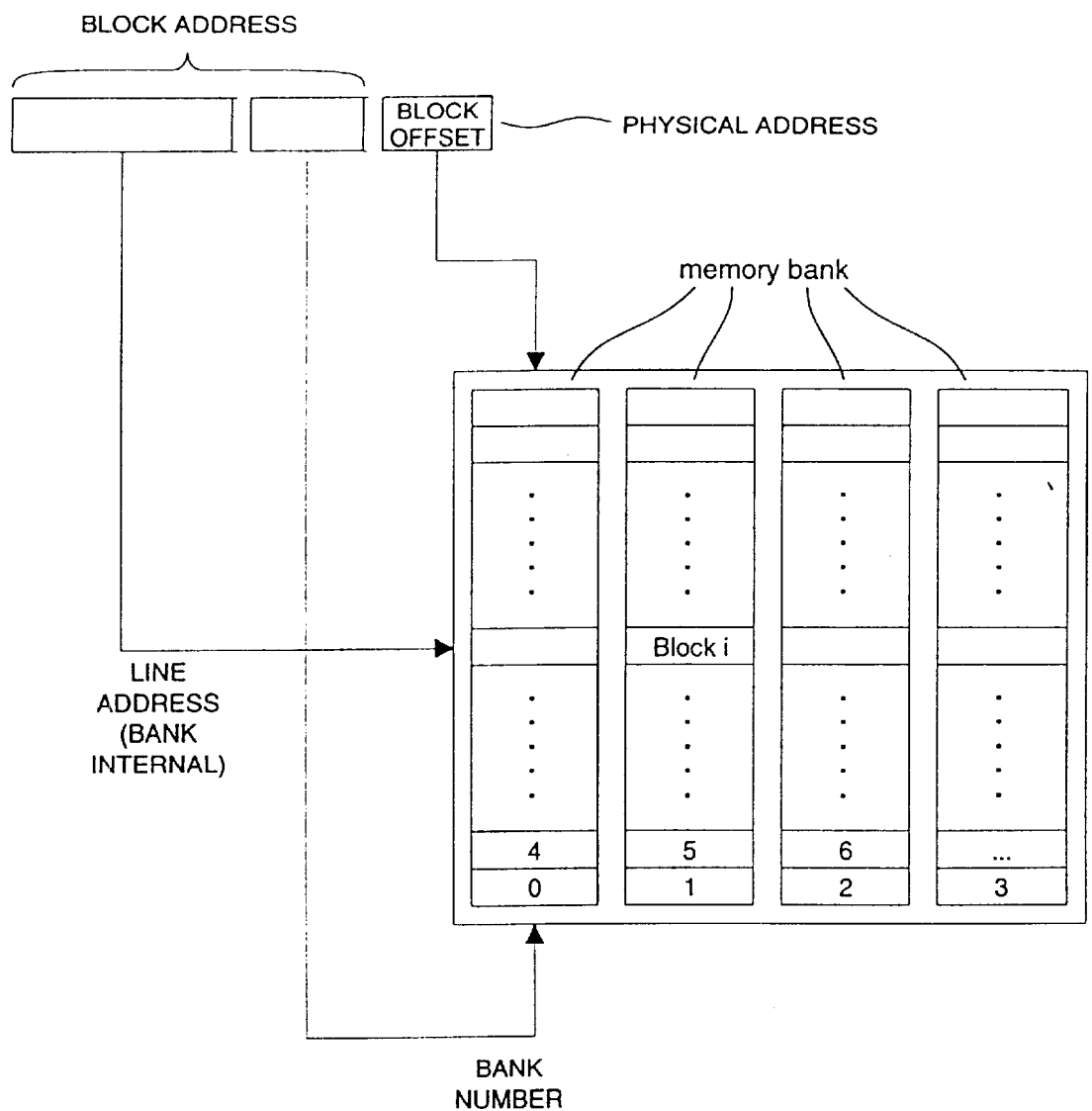
FIG. 2 illustrates a state-of-the art interleaving scheme.

The principle of present invention is illustrated in FIGS. 3A, 3B, and 3C. It should be noted that addresses which are shown in the following examples are all block addresses, i.e. the block offset within a block is not represented here because it is always maintained and therefore is not of interest for this invention (cf. also FIG. 2 where the offset and block address are both shown).

In FIG. 3A, there is shown in the left box the block address portion of a physical address which is to be mapped for accessing the system memory. In the following, only the term "physical address", "given address" or just "address" will be used to designate a block address as shown in FIG. 3A.

In the mapping process, a bank number and an address within the selected bank (internal bank address, i.e. line number) must be generated. This is done according to the invention by selecting two separate portions X and Y of the given address and using these as indexes (or table addresses) to access a lookup table, which then issues a memory bank identification, i.e., a bank number in the basic example.

Then, the address without the portion Y is used as internal bank address (line number) for the selected memory bank. FIG. 3B shows the system memory with four banks numbered 0 to 3, each having N internal bank addresses (line numbers). Each box in this figure (and in all following figures of detailed examples) represents one memory block.

FIG. 3C shows a very simple example of the content of a lookup table. It is assumed that both, X and Y consist of two bits so that four rows and four columns can be distinguished. Each position of the table contains one bank number which is used to address the respective bank for the block address. It can be seen that the first consecutive addresses, by using this table, are distributed over all four memory banks.

Definition of Used Variables

In the description, following designations are used:

First portion X consists of x bits at positions $p_0$, $p_1$, $p_2$, ... $p_{x-1}$ Second portion Y consists of y bits at positions $q_0$, $q_1$, $q_2$, ..., $q_{y-1}$ M is the number of memory banks in the system N is the size of a memory bank (number of internal bank addresses)

n is the number of address bits (of the physical block address)

It is assumed that the physical address space is continuous (addresses 0, 1, 2 ... )

The principle shown in FIGS. 3A, 3B, 3C is now taken as basis for all following embodiments. For increased clarity in every following figure in the left upper edge the block address is shown with its portions X and Y, below is shown the corresponding lookup table and to the right is shown the resulting content of the memory banks. Leading zeros are omitted in the drawings for better clarity.

Description of Particular Embodiments (a) General Facts:

The bank number in which a given address is mapped, is obtained by performing a lookup operation using the X and Y portions taken from the address as index for the lookup table.

The least significant bit of the X portion is at bit position $p_0$. Addresses that have a difference equal to $2^{p_0}$ have the same Y value and consecutive X values. The column in the LUT corresponding to this Y value determines how addresses with consecutive X values are mapped over the memory banks and therefore, the interleave factor for an address sequence with a stride equal to $2^{p_0}$.

In a similar way, addresses that have a difference equal to $2^{q_0}$ have the same X value and consecutive Y values, where $q_0$ is the bit position of the least significant bit of the Y portion. The row in the LUT corresponding to this X value determines how addresses with consecutive Y values are mapped over the memory banks, and therefore, the interleave factor for an address sequence with a stride equal to $2^{q_0}$.

In the following, the suffix "h" after a number means that this number is represented in hexadecimal notation, suffix "b" means a binary notation.

Figure 4A:
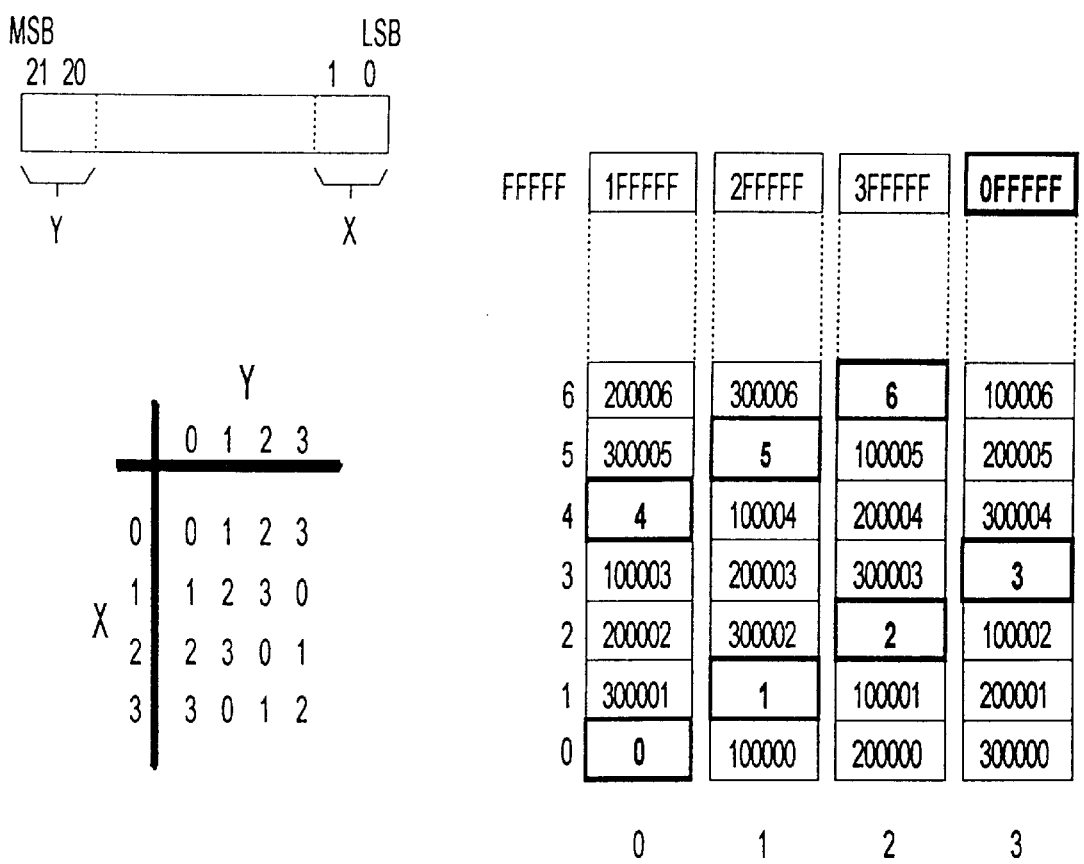
FIG. 4 (4A, 4B, 4C) is a first example of an embodiment of the invention in three variations (for three different power-of-2 strides), with 4 memory banks and an interleave factor of 4.

(b) First Example (FIGS. 4A/4B/4C):

In this example, 4 memory banks are provided, and an interleave factor of 4 will be achieved for address sequences having a stride which is a selected power-of-2 and another stride which is equal to 1. Three different cases A, B, C are represented in this example, each with a different stride.

Figure 4B:
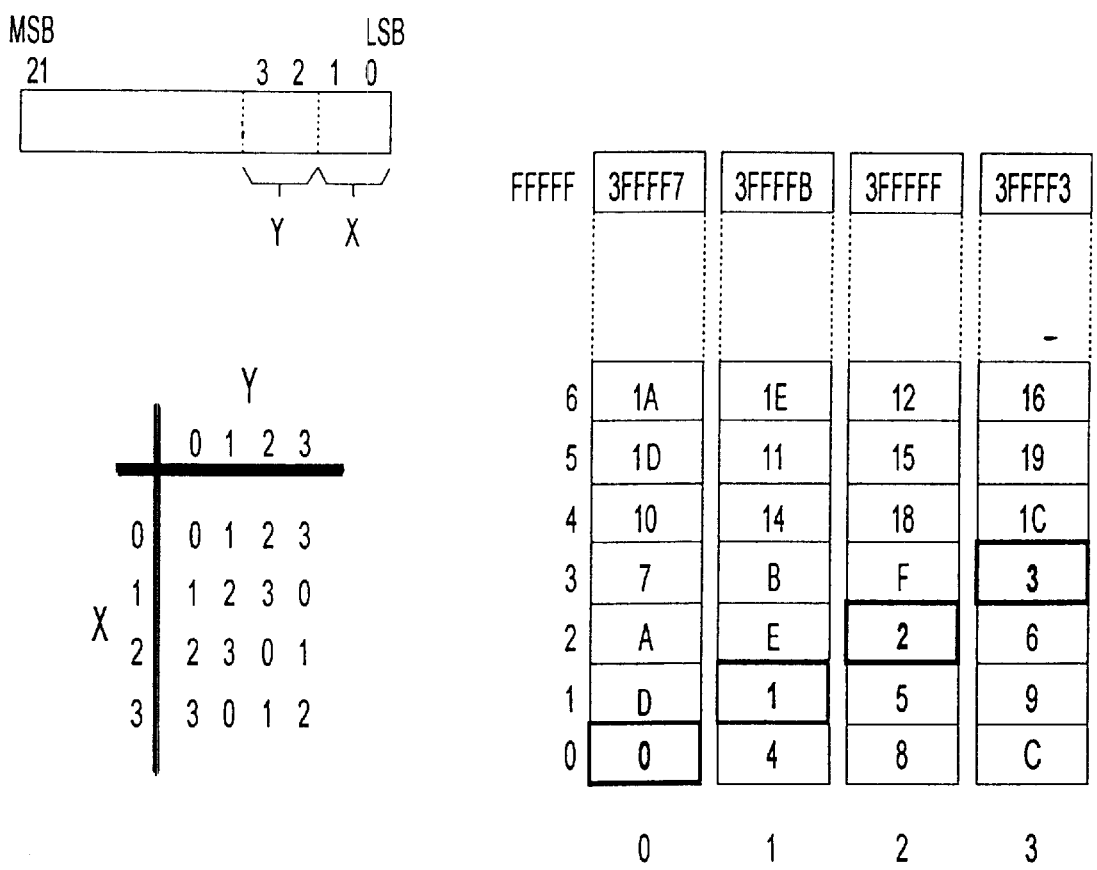
Figure 4C:
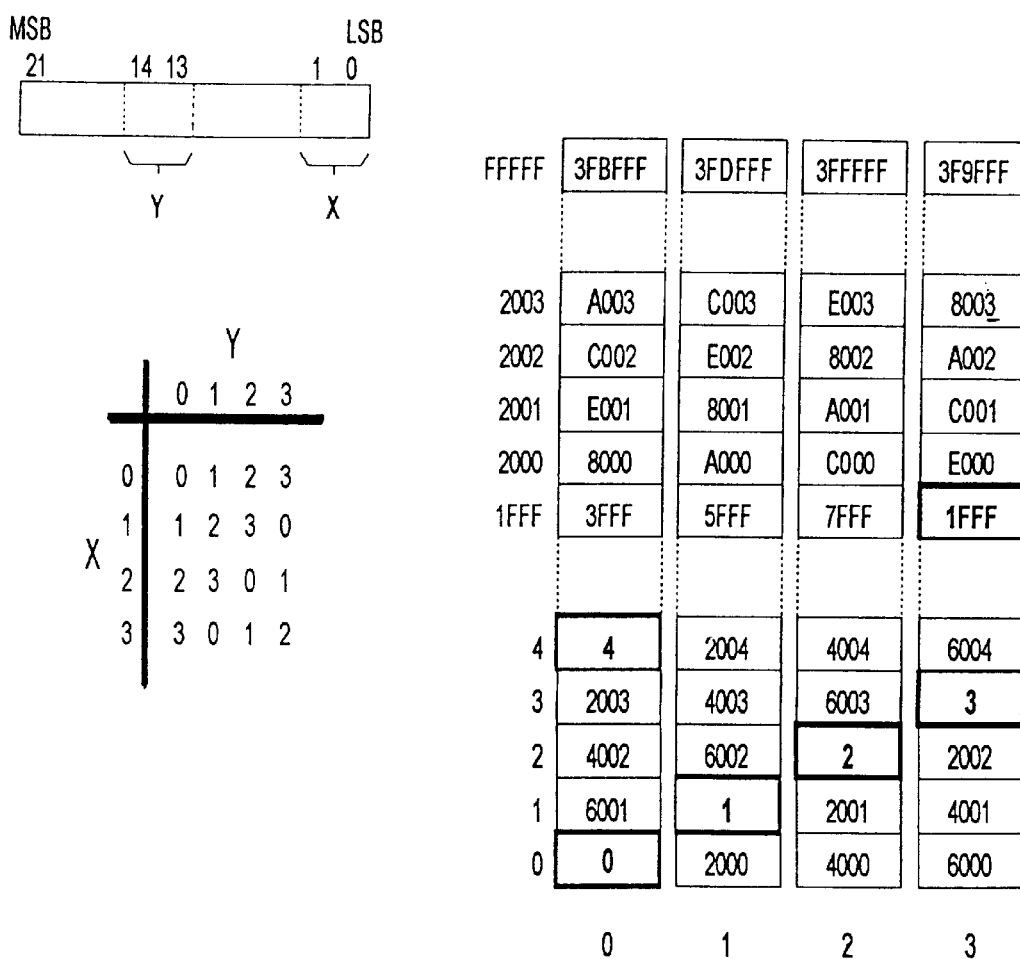

Bit position $p_0$ is fixed, $p_0=0$. All columns of the LUT are of size 4 and no bank number is contained twice within the same column. The number of memory banks equals 4. When accessing addresses with a stride of $2^{p_0}=1$, four memory banks can be accessed in parallel, for example the addresses contained in the group of blocks {0, 1, 2, 3} or the group of blocks {4, 5, 6, 7} can be accessed in parallel. Hence the average size of a group which contains blocks that are accessable in parallel over long address sequences equals 4. Consequently, address sequences with stride $2^{p_0}=1$ are mapped with an interleave factor equal to 4. The internal bank address is in FIG. 4A derived by omitting the Y portion and using the first 20 bits of the given address therefor. The internal bank address is in FIG. 4B derived by omitting the Y portion and using the first 2 bits attached to the last 18 bits of the given address therefor. The internal bank address is in FIG. 4C derived by omitting the Y portion and using the first 13 bits attached to the last 7 bits of the given address therefor. Bit position $q_0$ equals 20, 2, and 13 for example (A), (B), and (C) respectively. All rows of the LUT are of size 4 and no bank number is contained twice within the same row. The number of banks equals 4. When accessing addresses with strides $2^{q_0}=2^{20}=100000h$ (A), $2^{q_0}=2^2=4$ (B), and $2^{q_0}=2^{13}=2000h$ (C), 4 memory banks can be accessed in parallel. Consequently, address sequences with stride 100000h (A), 4 (B), 2000h (C) are mapped with an interleave factor equal to 4.

Figure 5:
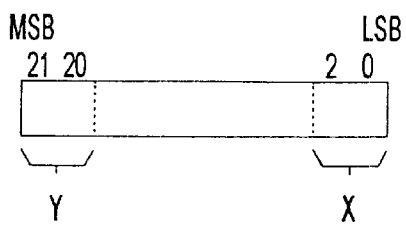
FIG. 5 is a second example of an embodiment of the invention, with 4 memory banks and a non-integer interleave factor equal to 2⅔.

(c) Second Example (FIG. 5):

In this example, 4 memory banks are provided, and an interleave factor of 2⅔ will be achieved for an address sequence having stride 1.

Bit position $p_0$ equals 0. Each column of the LUT contains three different bank numbers. For each sequence with a stride $2^{p_0}=1$, on the average 2⅔ memory banks can be accessed in parallel. For example the addresses contained in one of the groups {0, 1, 2}, {3, 4, 5}, {6, 7} can be accessed in parallel. Hence the average size of a group which contains blocks that are accessable in parallel over long address sequences equals 2⅔. Consequently, address sequences with stride $2^{p0}=1$ are mapped with an interleave factor equal to 2⅔.

Figure 6:
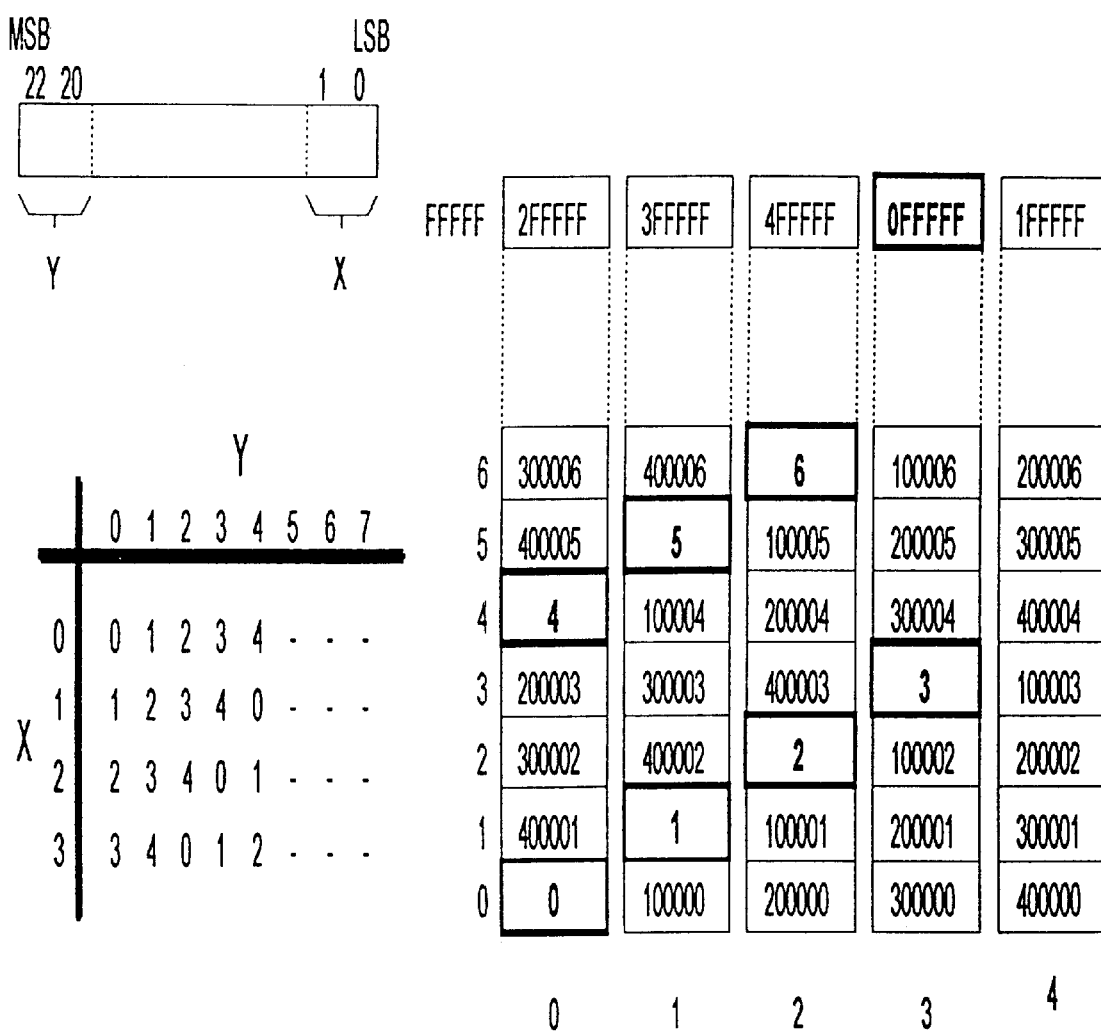
FIG. 6 is a third example of an embodiment of the invention, with 5 memory banks (i.e. non-power-of-2 number) and an interleave factor equal to 4.

(d) Third Example (FIG. 6):

In this example, 5 memory banks are provided, and an interleave factor of 4 will be achieved for an address sequence having stride 1.

The mapping scheme is choosen such that it 'fills up' 5 memory banks. This scheme does not need to take addresses with Y equal to and greater than 5 into account, since the maximum address that is mapped equals 4FFFFFh.

Figure 7:
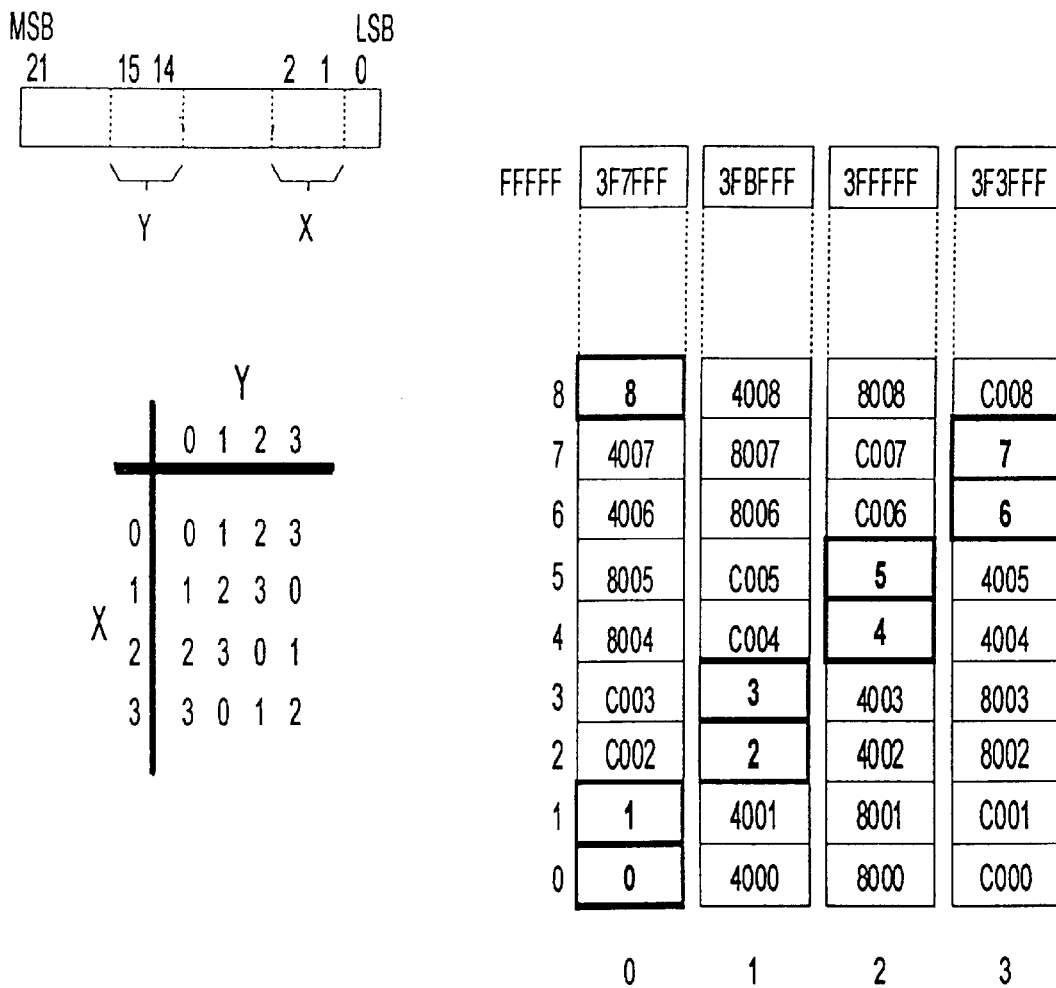
FIG. 7 is a fourth example of an embodiment of the invention, with 4 memory banks and an interleave factor of 4, and with two address sequences having two different strides in the same memory.

(e) Fourth Example (FIG. 7):

In this example, 4 memory banks are provided, and an interleave factor of 4 will be achieved in the same memory for two address sequences having two different power-of-2 strides. Bit position $p_0$ equals 1. All columns of the LUT are of size 4 and no bank number is contained twice within the same column. The number of memory banks equals 4. When accessing addresses with a stride of $2^{p0}=2$, then 4 memory banks can be accessed in parallel. For example addresses contained in one of the groups {0, 2, 4, 6} and { 1, 3, 5, 7} can be accessed in parallel. Hence the average size of a group which contains blocks that are accessable in parallel over long address sequences equals 4. Consequently, address sequences with stride $2^{p0}=2$ are mapped with an interleave factor equal to 4.

Bit position $q_0$ equals 14. All rows of the LUT are of size 4 and no bank number is contained twice within the same row. The number of banks equals 4. When accessing addresses with strides $2^{q0}=2^{14}=4000h$, 4 memory banks can be accessed in parallel. Consequenctly, address sequences with stride $2^{q0}=2^{14}=4000h$ are mapped with an interleave factor equal to 4.

(f) Fifth Example (FIG. 8):

In this example, 4 memory banks are provided, and two different interleave factors (2 and 4) will be achieved in the same memory for two address sequences having stride 1.

The most significant bit of X at bit position $p_2=21$, determines that addresses with X equal to '0xx'b ('x' means don't care) are mapped according to the lower part of the LUT (X values 0 to 3) and addresses with X equal to '1xx'b are mapped according to the upper part of the LUT (X values 4 to 7).

In this example, stride 1 address sequences between 0 and 1FFFFFh are mapped with an interleave factor equal to 4 and stride 1 address sequences between 200000h and 3FFFFFh are mapped with an interleave factor equal to 2.

(g) Sixth Example (FIG. 9):

In this example, 4 memory banks are provided having different size (three have 100000h locations, and one has 80000h locations). In two portions of the whole memory, two different interleave factors (4 and 2) are achieved for address sequences having stride 1.

The most significant bit of X at bit position $p_2=19$, determines that addresses with X equal to '0xx'b ('x' means don't care) are mapped according to the lower part of the LUT (X values 0 to 3) and addresses with X equal to '1xx'b are mapped according to the upper part of the LUT (X values 4 to 7). The lower mapping scheme is choosen such that it 'fills up' 4 memory banks. The upper mapping scheme is choosen such that it 'fills up' 3 memory banks. This last scheme does not need to take addresses with Y equal to 3 into account, since the maximum address that is mapped equals 37FFFFh.

Rules and Restrictions for Selection of X and Y and for the Lookup Table

1) The number x of bits in the first selected portion X which is extracted from the given physical block address should be smaller than the total number n of bits in this given physical block address:

x<n

2) The number y of bits in the second selected portion Y which is extracted from the given physical block address should satisfy the following condition:

$2^{y-1} < M \leq 2^y$ (where M is the number of memory banks)

3) Any bits can be selected from the physical block address for constituting (forming) the first selected portion X and the second selected portion Y. That is, bits $p_0 \ldots p_{x-1}$ of the first portion X, and bits $q_0 \ldots q_{y-1}$ of the second portion can be arbitrarily selected from the given physical block address. Of course, no overlap should occur (i.e., none of the physical block address bits should be used more than once).

Figure 8:
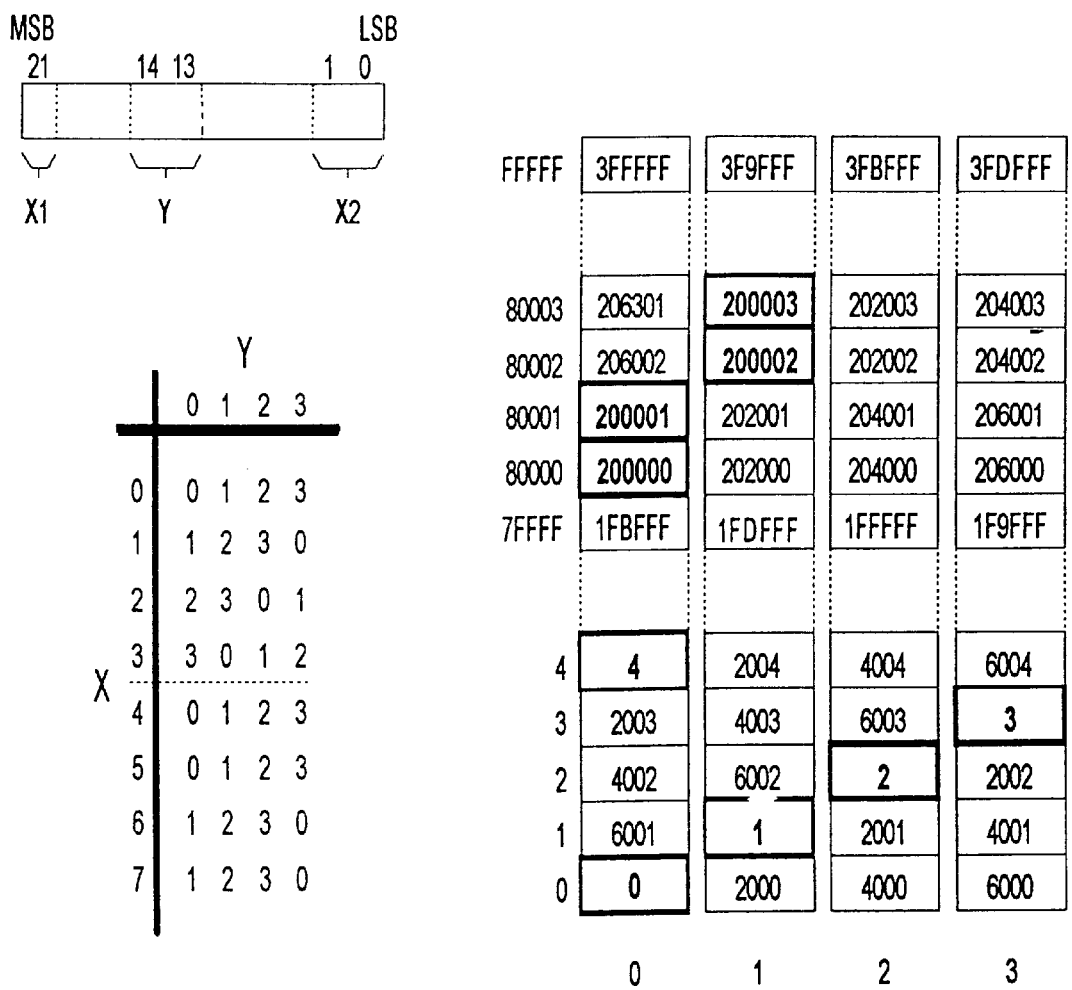
FIG. 8 is a fifth example of an embodiment of the invention, with 4 memory banks, but with two different interleave factors in two portions of the same memory.
Figure 9:
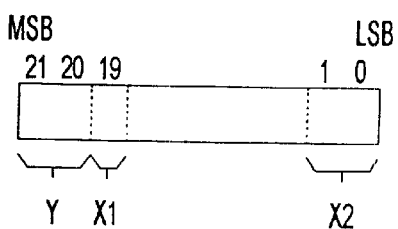
FIG. 9 is a sixth example of an embodiment of the invention, in which memory banks of different size are supported, and with two different interleave factors in two different portions of the memory.

It should be noted that the bits selected from the given physical block address for constituting the portion X or Y, need not be taken from continuous positions but can be bits or bit groups from non-contiguous positions of the physical block address (as shown in FIG. 8 and FIG. 9).

4) In the lookup table which is addressed by the portions X and Y, each row should not contain any memory bank number more than once. The same condition is valid when the lookup table contains masks or portions: The same bank number should not be used in more than one mask in one row.

To obtain the internal bank address from the address without the portion Y, any way of combining the bits of the address without the portion Y is suitable. Such, if the portion Y divides up the address into two parts, these parts can be attached together in any order, even by dividing them up into smaller portions such as bits. But also if the portion Y is at one end of the address, the remaining bits may be arranged in a different order. Also any intermediate operation is possible, e.g. an inversion of some or all bits.

The desired interleaving result together with the size and number of memory banks determines in the end the positions and size of the portions X, Y.

Implementation of the Lookup Table

The lookup table used for address mapping can be provided as a separately addressable circuitry, either read-only or loadable with the respective conversion table, in the memory controller of the system. It can, however, also be provided in the processor hardware.

If different lookup tables are to be used for different applications, such tables can either be provided as a plurality of read-only tables (selected according to the active application), or they can be loaded as required into a single table memory circuit at the start of the respective application.

Alternative Contents of Lookup Table

There may be cases where it is desirable to access more than one memory bank with a single given physical address. Such a case would be e.g. the upgrading to a processor/cache architecture having a larger cache line size.

If each location of the lookup table contains only one memory bank number, only a single memory bank is identified by any physical block address (as described in the embodiments). To allow multiple accesses as indicated above, each location of the lookup table may contain a bit mask or vector with a number of bits equal to the number of memory banks. Active bits, e.g. bits with value 1, in such a mask then indicate which of the memory banks are to be accessed when the respective location of the lookup table is addressed by the portions X and Y. For all memory banks which are selected simultaneously in this manner, the same internal bank address (line number) is used.

What is claimed is:

1. A method for mapping a given block address into at least one memory bank identification and an internal memory bank address for memory access in a system where data is stored in a plurality of memory banks in an interleaved fashion, said method comprising the steps of:

determining said at least one memory bank identification as output of a lookup operation in a lookup table, using as input two separate, selected portions of said given block address, each having a predetermined length and a predetermined location; and deriving said internal memory bank address within said at least one memory bank from said given block address without one of said two selected portions.

2. The method according to claim 1, wherein the lookup table comprises a plurality of locations, each location including a memory bank identification and being addressed by the two selected portions of the given block address.

3. The method according to claim 2, wherein one of the two selected portions is used for determining a row, and the other of the two selected portions is used for determining a column of a location in the lookup table.

4. The method according to claim 2, wherein in the lookup table the plurality of locations include bit masks, a number of bits in each of said masks being equal to a number of memory banks in the system, so that a plurality of memory banks are selected by the bits with a predetermined value of a single mask, and the locations in the lookup table are addressed by accessing one bit mask by said two selected portions of the given block address.

5. The method according claim 1, wherein at least one of the two selected portions includes at least two separate, non-contiguous groups of bits of the given block address.

6. The method according claim 1, wherein the given block address is a physical block address provided by the system.

7. The method according to claim 1, wherein the predetermined length and location of the separate, selected portions of said given address and contents of the lookup table select a desired mapping scheme for mapping the given block address.

8. A mapping means for mapping a given block address into at least one memory bank identification and an internal memory bank address for memory access in a system where data is stored in a plurality of memory banks in an interleaved fashion, said mapping means comprising:

means for determining said at least one memory bank identification as output of a lookup operation in a lookup table using as input two separate, selected portions of said given block address, each having a predetermined length and a predetermined location; and means for deriving said internal memory bank address within said at least one memory bank from said given block address without one of said two selected portions.

9. The mapping means according to claim 8, wherein the lookup table comprises a plurality of locations, each location including a memory bank identification and being addressable by the two selected portions of the given block address.

10. The mapping means according to claim 9, wherein one of two selected portions determines a row, and the other of the two selected portions determines a column of the location in the lookup table.

11. The mapping means according to claim 9, wherein in the lookup table the plurality of locations include bit masks, a number of bits in each of said masks being equal to the number of memory banks in the system, so that a plurality of memory banks are selected by the bits with a predetermined value of a single mask, and the locations in the lookup table are addressed by accessing one bit mask by said two selected portions of the given block address.

12. The mapping means according to claim 8, wherein at least one of the two selected portions includes two separate, non-contiguous groups of bits of the given block address.

13. The mapping means according to claim 8, wherein the given block address is a physical block address provided by the system.

14. The mapping means according to claim 8, wherein the predetermined length and location of the separate, selected portions of said given block address and contents of the lookup table select a desired mapping scheme for mapping the given block address.

15. A memory system comprising a mapping means for mapping a given block address into at least one memory bank identification and an internal memory bank address for memory access where data is stored in a plurality of memory banks in an interleaved fashion, said mapping means comprising:

means for determining said at least one memory bank identification as output of a lookup operation in a lookup table, using as input two separate, selected portions of said given block address, each having a predetermined length and a predetermined location; and means for deriving said internal memory bank address within said at least one memory bank from said given block address without one of said two selected portions.

16. The memory system according to claim 15, wherein the predetermined length and location of the separate, selected portions of said given block address and contents of the lookup table select a desired mapping scheme for mapping the given block address.

17. The memory system according to claim 15, wherein the lookup table comprises a plurality of locations, each location including a memory bank identification and being addressable by the two selected portions of the given block address.

18. The memory system according to claim 17, wherein in the lookup table the plurality of locations include bit masks, a number of bits in each of said masks being equal to the number of memory banks in the system, so that a plurality of memory banks are selected by the bits with a predetermined value of a single mask, and the locations in the lookup table are addressed by accessing one bit mask by said two selected portions of the given block address.

19. The memory system according to claim 17, wherein one of two selected portions determines a row, and the other of the two selected portions determines a column of the location in the lookup table.

20. The memory system according to one of claim 15, wherein at least one of the two selected portions includes two separate, non-contiguous groups of bits of the given block address.

21. The memory system according to claim 15, wherein the given block address is a physical block address provided by the system.

22. A computer comprising a memory system for mapping a given block address into at least one memory bank identification and an internal memory bank address for memory access where data is stored in a plurality of memory banks in an interleaved fashion, said memory system comprising:

means for determining said at least one memory bank identification as output of a lookup operation in a lookup table, using as input two separate, selected portions of said given block address, each having a predetermined length and a predetermined location; and means for deriving said internal memory bank address within said at least one memory bank from said given block address without one of said two selected portions.

23. A data processing system comprising a memory system for mapping a given block address into at least one memory bank identification and an internal memory bank address for memory access where data is stored in a plurality of memory banks in an interleaved fashion, said memory system comprising:

means for determining said at least one memory bank identification as output of a lookup operation in a lookup table, using as input two separate, selected portions of said given block address, each having a predetermined length and a predetermined location; and means for deriving said internal memory bank address within said at least one memory bank from said given block address without one of said two selected portions.

* * * * *

UNITED STATES PATENT AND TRADEMARK OFFICE
CERTIFICATE OF CORRECTION

PATENT NO. : 6,381,668 B1  
DATED : April 30, 2002  
INVENTOR(S) : J. Lunteren

It is certified that error appears in the above-identified patent and that said Letters Patent is hereby corrected as shown below:

<u>Title page,</u>  
Item [56], References Cited, U.S. PATENT DOCUMENTS, insert  
-- 5,293,607    3/1994    Brockmann et al.  
   5,341,486    8/1994    Castle  
   5,754,394    5/1998    Evans et al. --

Item [56], References Cited, OTHER PATENT DOCUMENTS, insert  
-- Shippy, et al. (1992) "Multi-Processing Programmable Memory Interleave Apparatus", IBM Technical Disclosure Bulletin, Vol 35:6, pgs 400-402. --

Signed and Sealed this

Eighth Day of October, 2002

*Attest:*

*Attesting Officer*

JAMES E. ROGAN  
*Director of the United States Patent and Trademark Office*